Patented Aug. 11, 1942

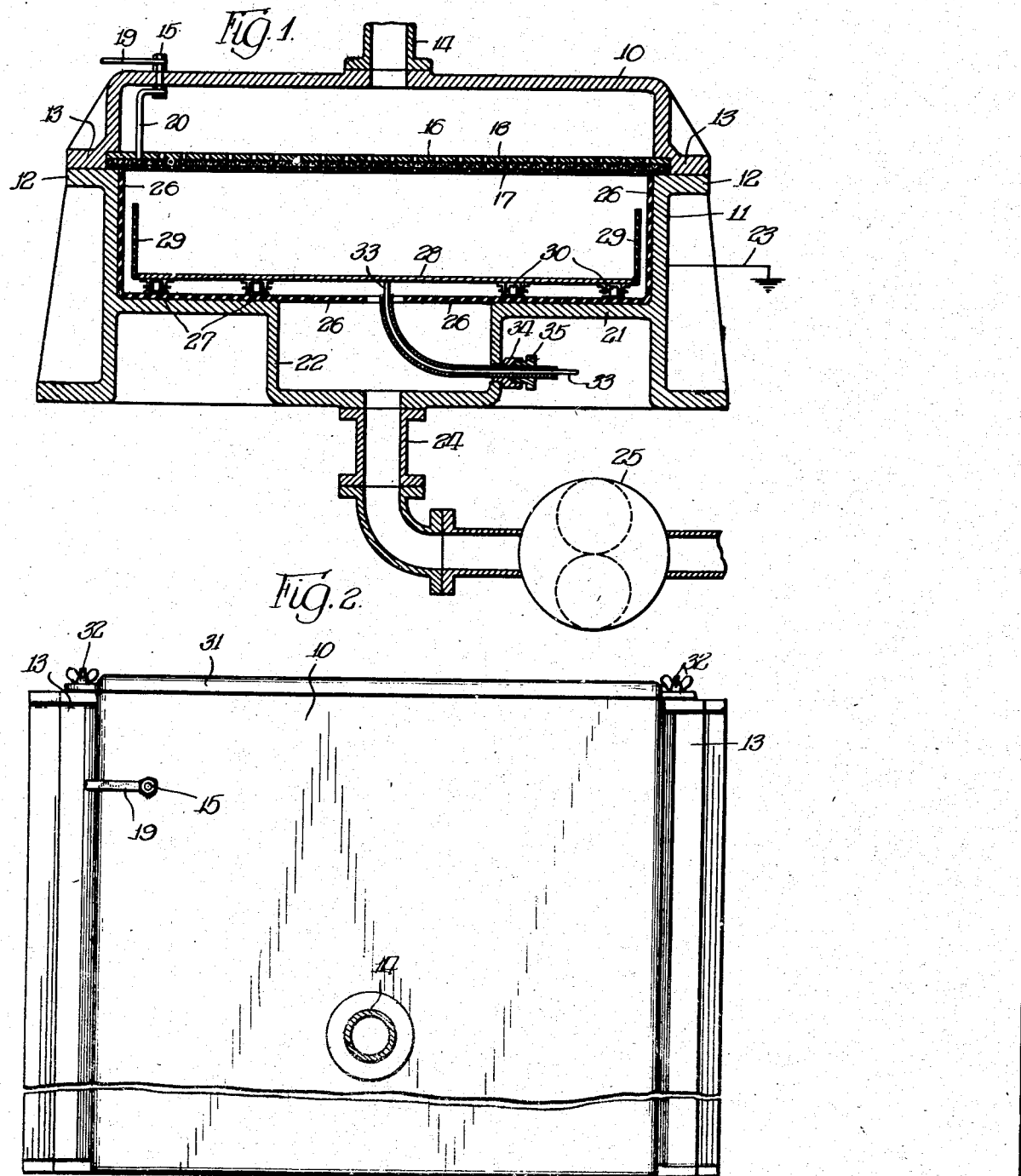

2,292,608

UNITED STATES PATENT OFFICE 2,292,608

ELECTRIC APPARATUS FOR SEPARATION OF SUSPENDED SOLID PARTICLES FROM ORGANIC LIQUIDS

Stanley J. Buckman and Victor Frank Hribar, Louisville, Ky., assignors to American Creosoting Company, Louisville, Ky., a corporation of Delaware Application March 31, 1939, Serial No. 265,262

4 Claims. (Cl. 204—299)

The present invention relates to the removal of solid particles from organic liquids and has particular reference to a novel apparatus for separation of suspended particles from organic liquids such as coal tar and to an improved method involving filtration of the organic liquid in a particular manner in the presence of an electric potential.

Processes of this general type have been used widely in the removal of solid particles from organic liquids. Generally, the liquid is passed through a non-conducting filter cloth which is supported by a pervious metallic surface constituting one electrode connected to a source of high voltage electric current, the other electrode usually being the filter housing. The pervious metallic electrode supporting the filter cloth may bear a charge of the same or opposite sign to the sign of the charge borne by the particles suspended in the liquid to be filtered. If this electrode bears a charge of the same sign as the charge borne by the particles, there is a repelling force exerted upon the particles as they approach the filter medium, while if it is of opposite sign the particles are attracted to the filter medium.

A principal object of the present invention is to provide an improved method and apparatus for the electro-mechanical filtration of organic liquids employing a relatively low voltage direct current.

An additional object is the provision of apparatus of the type described having an electrically conductive filter member directly exposed to the organic liquid containing particles to be removed and constituting one of a pair of electrodes having a relatively low potential impressed therebetween and being of the same sign as the charge borne by the particles, there also being provided a pressure-increasing device responsive to a change in rate of flow through the filter member.

Another object is to provide an electromechanical filter having a main filter chamber with an electrically conductive horizontal foraminous filter member above the bottom as one electrode and a removable tray type container below and spaced from the filter member as the other electrode, the operation of the filter involving alternately passing a flow of liquid upwardly through the filter member during the filtering operation and downwardly therethrough during a short cleaning period while the tray electrode is in position.

A further object of the invention is the provision of mechanism for separating solid particles from organic liquids in which a main filtration chamber is provided with a transversely extending foraminous electrically conductive filter member bearing a charge of the same sign as the charge borne by the particles to be removed from the liquid, insulated walls and flooring below the transverse filter member, a removable tray-type electrode positioned adjacent the lower portion of the filtration chamber and of opposite sign to the filter member, upwardly extending non-conducting outer walls on the electrode, an inlet compartment below the electrode, and a reversible pressure pump adapted to supply liquid to the inlet compartment.

Still another object is to filter organic liquids containing suspended solid particles by passing the liquids under pressure through a directly charged foraminous filter member bearing a charge of the same sign as the charge borne by particles to be removed from the liquids, periodically discharging the resulting discrete cake from the filter member by reversal of liquid flow therethrough, and receiving and concentrating the cake adjacent a surface bearing an electrical charge of opposite sign to that of the filter member, the filter member and surface being connected to a relatively low voltage supply of direct current.

These and other objects of the invention will be observed upon a consideration of the following specification and by reference to the accompanying drawing, in which Fig. 1 is a central sectional view showing apparatus constructed in accordance with the invention; and Fig. 2 is a top view of the apparatus, partly broken away, showing an end door through which the tray-type electrode may be removed.

Various organic liquids such as coal tar, coal tar creosote, crude petroleum, lubricating oils, and transformer oils contain suspended insoluble solid particles, the removal of which is desirable either for recovery of the particles or for purification of the liquids. For example, in the impregnation of wood with coal tar it is desirable that the coal tar be relatively free from insoluble particles which have a plugging effect and render it a costly and time-consuming operation to obtain the desired retention and distribution of the coal tar throughout the necessary portion of the wood." The purification of coal tar constitutes a preferred application of the invention and the process and apparatus will be described in particular with reference thereto.

Ordinary methods of filtration prove unsatisfactory in the case of coal tar which contains suspended particles, the difficulty being due largely to the viscous characteristic of the liquid. The amount of the insoluble particles in the coal tar will depend upon the previous treatment which the liquid has received, but usually is of the order of about 1½ to 3½ per cent, based on the weight of the liquid. Ordinarily, the particles contained in the coal tar will have an average size of about one micron. The viscosity characteristics of the coal tar are such that particles of this size and nature will not settle out on standing over an extended period. Use of previously known methods and types of equipment involving electromechanical filtration does not improve upon the results obtained by ordinary filtration sufficiently to render such methods and apparatus of particular benefit in purifying the coal tar.

In accordance with the present invention the coal tar to be purified is passed through apparatus of the type shown in the drawing. This apparatus includes a main filtration chamber provided by the upper housing 10 and the lower housing 11. The housings 10 and 11 form together a compartment of rectangular cross-section, as will be seen from Fig. 1, the plane of jointure between the two housings being spaced well above the bottom of the lower housing and somewhat below the top of the housing 10. The housing 11 is provided with flanges 12 and the housing 10 has the flanges 13. Any suitable type of mechanism may be employed for releasably holding the flanges 12 and 13 together. The seal between the upper and lower housings is sufficient to withstand the liquid pressure incident to the filtration operation.

The upper housing 10 is provided with a liquid outlet 14 and an electrically conductive post 15.

Extending transversely of the main filtration chamber in substantially a horizontal manner is an electrically conductive foraminous filter member 16 such as a woven stainless steel wire cloth. The particular weave of the cloth will depend upon the nature of the liquid to be purified. In the filtration of coal tar a cloth of the 50 x 750 strands per inch type may be employed.

The filter member is mounted in an inset in the housing 10 adjacent its plane of jointure with the housing 11. On its lower face the filter member is supported by a thin metallic grating 17 which may have 80 per cent or more open area. On the top of the screen 16 is mounted a perforated metal plate or grating 18. Preferably the plate 18 is corrugated to provide adequate drainage. The grating 17 and the plate 18 afford support to the filter member 16 regardless of the direction of flow of liquid therethrough.

The post 15 is connected to the anode of a source of direct electric current by means of the line 19, and the conductor 20 extends from the post 15 directly to the filter member 16. It will be seen that the filter member 16 is electrically charged and constitutes an anode directly exposed to the space therebelow.

The bottom 21 of the housing 11 is provided with a central downwardly extending inlet compartment 22. The entire housing is grounded as indicated at 23.

An inlet pipe 24 connects with the compartment 22 and leads to a reversible pressure pump 25, the latter preferably being of the gear type.

The interior walls of the housing 11 are provided with an insulating material indicated at 26. It is preferred that the insulating material extend partially across the inlet compartment 22, as shown in the drawing.

Running longitudinally of the bottom 21 of the housing 11 are a plurality of tracks 27. Mounted on the tracks is a tray-type of cathode having a metallic base 28 substantially parallel to the metallic filter member 16 and spaced below the latter a distance which may be of the order of about 1 foot. The plate 28 has mounted about its edge portions the upstanding walls 29, which are constructed of insulating material. It will be noted that the plate 28 is somewhat smaller than the filtration chamber so as to provide space for flow of liquid about the walls 29.

To the bottom of the plate 28 are mounted a series of rollers 30, the latter being positioned to travel along tracks 27, so that the entire structure supported by the rollers may be withdrawn from the filtration compartment through the end door 31 thereof. The door 31 may be of any suitable construction and is mounted in liquid-sealed relation at the open end of the filtration chamber, as by means of the wing nuts 32.

To the bottom of the metallic plate 28 is secured an electrical connection 33, this line passing through the inlet compartment 22 and being insulated with respect thereto. Within the inlet compartment the conductor 33 is of sufficient length to allow the tray-type electrode to be withdrawn from the filtration chamber. The line 33 is sealed in liquid-tight relationship with respect to the inlet chamber 22 by means of conventional compression nuts 34 and 35.

The device described is operated in cycles, including an initial period during which the pump 25 passes coal tar under pressure through the inlet opening 22, about the tray-type cathode, through the filter member 16, and outlet pipe 14. The transverse filter member 16 may be spaced apart from the parallel plate 28 a distance of approximately 1 foot and in the case of a distance of this magnitude it is suitable to employ a potential of approximately 3,000 volts. The coal tar may be introduced at a temperature of about 300° F., at which temperature the liquid will have a viscosity of about 1.0 centipoise or less. It is significant to note that the liquid in the filtration chamber comes directly in contact with and passes through the charge-bearing wire cloth anode 16. The particles in the coal tar bear a positive charge and as the coal tar passes through the filter member the potential between the filter member and the cathode 28 results in immediate clarification of the coal tar and the formation of a type of cake which subsequently is readily freed from the filter member. The flow through the filter member may be of the order of 10 gallons per square foot per hour, which is many times greater than the possible flow in a normal filtration operation in the case of liquids of this type.

Building up of the filter cake with continued operation results in an increased resistance to flow through the apparatus. The flow may be maintained approximately constant by increasing the pressure exerted by the pump 25 as the resistance to flow increases. Normally, this increase in pressure will be effected by increasing the speed of the gear pump. When the resistance of the filter element builds up to such an extent as to require undue pressure to maintain flow therethrough, the flow through the filter chamber may be reversed. The reversal may be made when a pressure of the order of 100 pounds per square inch is necessary to maintain a satisfactory flow through the filter member. Reversal of the flow causes the cake attached to the under side of the filter member to be kicked off and to fall downwardly into the tray-type cathode. Thereafter, the flow through the filter again may be directed upwardly to commence a new cycle of operation.

The tray-type cathode is not adversely affected in operation by deposition of the separated solids thereon. On the contrary, the cathode effects a concentration of the particles so as to conserve the amount of liquid wasted in removing the particles from the process.

The same sign of the charge on the particles being separated from the coal tar and on the filter member permits the use of a wire cloth having larger interstices than otherwise could be employed to obtain immediate clarification. The electrical repulsion exerted by the filter member itself seems to prevent clogging of the openings between the wires of the filter member and causes the formation of a cake on the under face of the wire cloth without unduly clogging it. It appears that when liquid containing suspended solids comes within the immediate vicinity of the charged filter member the direct repulsion exerted by the charge on the member causes the particles in the coal tar to pile up on the under side of the element without undue impregnation of the interstices thereof.

The opposite charge carried by the cathode 28 in effect results in an electrodeposition of carbon particles on the plate. The tray is sufficiently large to hold a number of the cakes kicked off from the filter member. The tray may be of such size as to require removal for cleaning once each day. The carbon particles which constitute the principal solids separated from the coal tar are deposited on the tray in intimate contact with plate 28 and as these particles are good conductors of electricity they do not interfere with the functioning of the plate as a cathode. It sometimes is necessary to chip the carbon particles off of the plate 28, because of the firm union effected by the operation. The potential between the filter member and the cathode is too low to exert a distinct retarding effect on the particles in the liquid being filtered prior to their coming adjacent the filter member. Likewise, the attraction exerted by the cathode may not be sufficient to exert a substantial attraction for the particles contained in the coal tar passing through the filtration chamber toward the filter member. However, the repulsion exerted by the wire filter member is sufficient to cause the formation of the desired type of filter cakes directly on the filter member and the attraction exerted by the cathode is sufficient to exert a concentrating effect on particles in its vicinity and to retain these particles against re-suspension in the coal tar. The desired actions are exerted by the anode and cathode regardless of the size of particles in the liquid. These particles may vary in size from those which exhibit colloidal properties to those which have the properties of coarser suspensions.

The immediate clarification obtained upon initiating the filtering operation and the nature of cake which is built up makes it feasible to remove the cake at frequent intervals before the thickness of the cake builds up to the point at which it resistance to flow therethrough is unduly increased, and concentration by the cathode of the thin cakes thus frequently discharged from the filter member effectively disposes of the material without removing it from the filter chamber. The same current which is utilized in the filtering operation at the anode also effects at the cathode a concentration of the pieces of filter cake discharged from the anode, thereby making it unnecessary periodically to remove an appreciable quantity of liquid from the filter chamber in order to remove discharged cake from the unfiltered liquid system. Frequent discharge of cake from the filter member is desirable in order to maintain the desired rate of flow without undue pressure. The thickness of the cake discharged under these conditions in the filtration of coal tar may be of the order of $\frac{1}{32}$ of an inch. A cake of this thinness cannot be discharged from the filter chamber without loss of appreciable quantities of coal tar and filtering time. These losses are avoided by utilization of the cathode in concentrating the cake and removing it from the liquid being filtered without interrupting the filtering operation. When the concentrated cake finally is removed from the cathode after a series of filtering operations it may have a thickness of the order of 8 inches.

It will be recognized that many changes may be made in the structure and process described herein for purposes of explanation without departing from the scope of the invention as defined by the appended claims. For instance, the reversible liquid supply system may include a pump in the outlet pipe for reversing the flow through the filter member during the cleaning period.

We claim:

1. A device for removing suspended solid particles from an organic liquid, comprising a filter chamber having an electrically conductive foraminous filter member electrode horizontally disposed, a second imperforate electrode removably positioned below said member and substantially parallel thereto, non-conductive upwardly extending sides on said second electrode, electrical connections from a direct current source of about 3,000 volts respectively to said member and said second electrode, and pumping means for passing an organic liquid containing suspended solid particles upwardly through said filter member under an increasing pressure, said means being reversible to provide downward flow to discharge particles from the filter member.

2. A device for removing suspended solid particles from an organic liquid, comprising a filter chamber having a horizontally disposed porous metal filter electrode, supporting means for said filter electrode, a horizontally disposed removable plate-type imperforate electrode parallel to and below said filter electrode, said plate-type electrode having non-conductive upwardly extending sides spaced from the sides of said chamber, a liquid inlet below said lower electrode, a liquid outlet above said filter electrode, and reversible pumping means for passing liquid under pressure in reverse directions through said liquid inlet and said filter electrode, the charge on said filter electrode being of the same sign as the charge on said particles and the charge on said plate-type electrode being of opposite sign to the charge on said particles, the source of the electrode charges being a direct current of outside generated electrical energy.

3. A device for removing suspended solids from an organic liquid, comprising a filter chamber having a directly exposed horizontally disposed porous metal electrode having openings therein sufficiently small to filter said particles, a horizontally disposed removable plate-type imperforate electrode positioned in said chamber below and substantially parallel to said porous metal electrode, the charge on said plate-type electrode being of opposite sign to the charge on said porous metal electrode the source of said charges being a direct current of outside generated electrical energy and said plate-type electrode having upwardly extending non-conductive sides spaced from the sides of said chamber, a removable door on the end of said chamber adjacent said plate-type electrode, and pumping means for passing a liquid containing suspended solids upwardly through said porous metal electrode to remove suspended particles and periodically in the reverse direction through said electrode, whereby accumulated particles on the underside of said porous metal electrode are discharged therefrom in the reverse direction of flow and received by said plate-type electrode, the charge on said porous metal electrode being of the same sign as the charge on said particles.

4. A device for removing suspended solids from an organic liquid, comprising a filter housing having a top, sides, a bottom, and an inlet chamber positioned below and opening into said bottom, insulating means for said sides and bottom, a horizontally disposed porous metal filter electrode positioned in said housing above said bottom, a horizontally disposed particle receiving plate-type imperforate electrode removably positioned on said bottom in spaced parallel relation with respect to said filter electrode, the charge on said filter electrode being of the same sign as the charge on the particles to be removed from said liquid, and the charge on said plate-type electrode being of opposite sign to the charge on said particles the source of said charges being a direct current of outside generated electrical energy, a door member serving as side of said housing adjacent said plate-type electrode, and pumping means for passing liquid upwardly through said inlet chamber, about said plate-type electrode, and upwardly through said porous metal electrode and for reversing the flow of said liquid to dislodge solids deposited on said porous metal electrode, whereby said solids are received by said plate-type electrode.

STANLEY J. BUCKMAN.
VICTOR FRANK HRIBAR.